United States Patent
Ebrahimifard et al.

(10) Patent No.: US 6,396,897 B1
(45) Date of Patent: May 28, 2002

(54) METHOD AND APPARATUS FOR SELECTING RETROSPECTIVE RECONSTRUCTION PARAMETERS

(75) Inventors: Badi Ebrahimifard; Christopher C. Slack, both of New Berlin, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/551,457

(22) Filed: Apr. 18, 2000

(51) Int. Cl.[7] .................................................. A61B 6/03
(52) U.S. Cl. ............................. 378/4; 378/15; 378/501
(58) Field of Search ............................... 378/4, 15, 901

(56) References Cited

U.S. PATENT DOCUMENTS

| | | | |
|---|---|---|---|
| 4,629,989 A | 12/1986 | Riehl et al. | |
| 5,514,957 A | * 5/1996 | Tatebayashi | 324/309 |
| 5,987,093 A | * 11/1999 | Ozaki | 378/62 |
| 6,061,420 A | 5/2000 | Strong et al. | |
| 6,081,576 A | 6/2000 | Schanen et al. | |
| 6,144,201 A | * 11/2000 | Miyazaki | 324/306 |
| 6,198,791 B1 | 3/2001 | He et al. | |
| 6,275,562 B1 | 8/2001 | He et al. | |

* cited by examiner

Primary Examiner—David V. Bruce
(74) Attorney, Agent, or Firm—Carl B. Horton, Esq.; Armstrong Teasdale LLP

(57) ABSTRACT

A method for reconstructing an image from imaging data using an imaging system configured to accept input from an imaging system operator. The method includes steps of generating a first model from the imaging data; accepting as input an operator-specified region of interest based on the first model; and generating a second model from the imaging data based on the specified region of interest. This method simplifies entry of parameters for retrospective image reconstruction by using the operator-entered region of interest as input for automated parameter selection.

28 Claims, 2 Drawing Sheets

METHOD AND APPARATUS FOR SELECTING RETROSPECTIVE RECONSTRUCTION PARAMETERS

BACKGROUND OF THE INVENTION

This invention relates generally to imaging systems and, more particularly, to methods and apparatus for retrospectively reconstructing an image using a region of interest specified by an imaging system operator.

Imaging systems include a source that emits signals (including but not limited to x-ray, radio frequency, or sonar signals), and the signals are directed toward an object to be imaged. The emitted signals and the interposed object interact to produce a response that is received by one or more detectors. The imaging system then processes the detected response signals to generate an image of the object.

For example, in computed tomography (CT) imaging, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles, or view angles, during one revolution of the x-ray source and detector. In an axial scan, the projection data is processed to construct an image that corresponds to a two-dimensional slice taken through the object.

One method for reconstructing an image from a set of projection data is referred to in the art as the filtered back projection technique. This process converts the attenuation measurements from a scan into integers called "CT numbers" or "Hounsfield units", which are used to control the brightness of a corresponding pixel on a cathode ray tube display.

To reduce the total scan time required for multiple slices, a "helical" scan may be performed. To perform a "helical" scan, the patient is moved while the data for the prescribed number of slices is acquired. Such a system generates a single helix from a one-fan-beam helical scan. The helix mapped out by the fan beam yields projection data from which images in each prescribed slice may be reconstructed. In addition to reduced scanning time, helical scanning provides other advantages such as improved image quality and better control of contrast.

It is known to use an imaging system, e.g. a CT imaging system, to retrospectively reconstruct images, e.g. axial images, from raw scan data. Retrospectively reconstructed images can differ in various respects from original scan images. For example, axial slices can be reconstructed closer together or farther apart than those of the original scan, and the scan field of view can be reduced to concentrate reconstruction within a smaller scan region in order to resolve more detail.

When prescribing retrospective image reconstruction, an operator enters a series of parameters into the imaging system in order to specify image reconstruction characteristics such as a new field of view. Having to determine and enter sequences of parameters, however, can increase chance for error.

It would be desirable to allow an imaging system operator to select parameters specifying retrospective image reconstruction without having to determine and enter a lengthy parameter sequence. It also would be desirable to provide the operator with a way to use a selection of a region of interest within a scan to specify retrospective image reconstruction.

BRIEF SUMMARY OF THE INVENTION

There is therefore provided, in one embodiment, a method for reconstructing an image from imaging data using an imaging system configured to accept input from an imaging system operator, the method including the steps of generating a first model from the imaging data; accepting as input an operator-specified region of interest based on the first model; and generating a second model from the imaging data based on the specified region of interest.

The above-described method simplifies entry of parameters for retrospective image reconstruction by using the operator-entered region of interest as input for automated parameter selection.

DETAILED DESCRIPTION OF THE INVENTION

Figure 1:
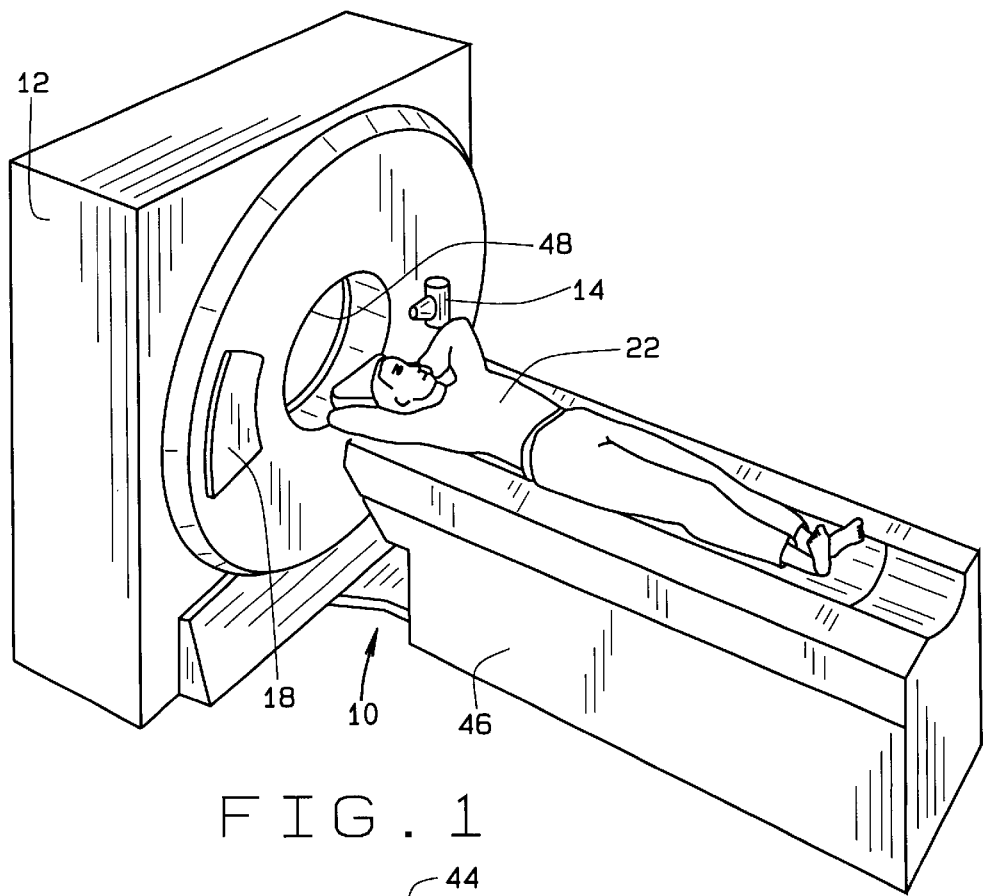
FIG. 1 is a pictorial view of a CT imaging system.
Figure 2:
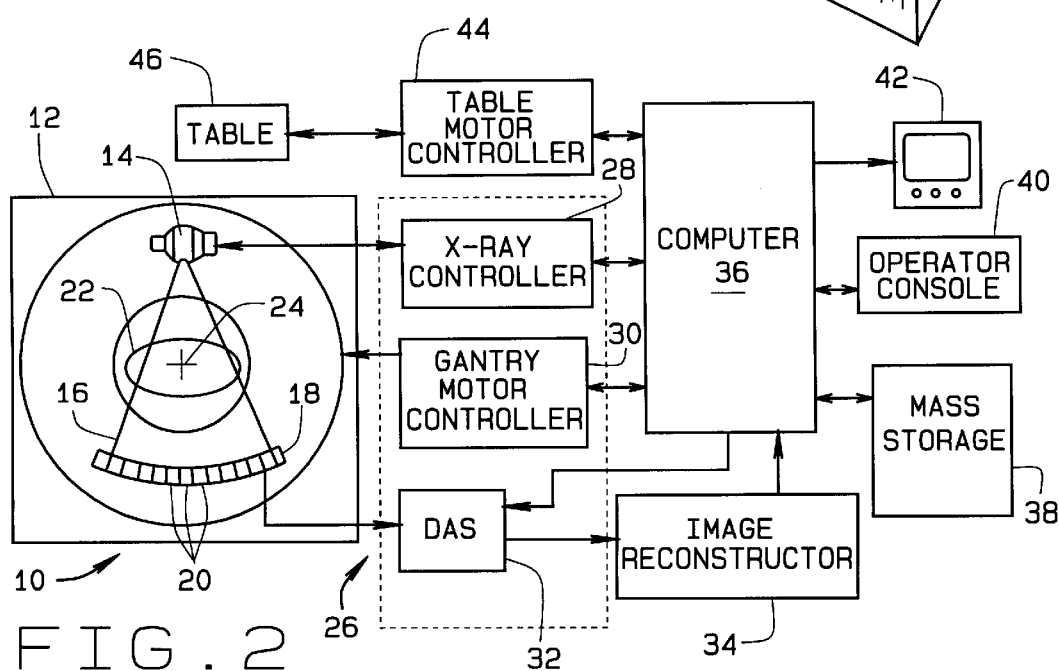
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14, for example an x-ray tube, that projects a beam of x-rays 16 toward a detector array 18 on the opposite side of gantry 12. Detector array 18 is formed by detector elements 20 that together sense the projected x-rays that pass through an object 22, for example a medical patient. Detector array 18 may be fabricated in a single slice or multi-slice configuration. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation, or origin, 24.

Rotation of gantry 12 and the operation of x-ray source 14 are governed by a control mechanism 26 of CT system 10. Control mechanism 26 includes an x-ray controller 28 that provides power and timing signals to x-ray source 14. Control mechanism 26 also includes a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high-speed image reconstruction. The reconstructed image is applied as an input to a computer 36 that stores the image in a mass storage device 38.

Computer 36 also receives commands and scanning parameters from an operator (not shown) via console 40 that has a keyboard. An associated cathode ray tube display 42 allows the operator to observe the reconstructed image and other data from computer 36. The operator-supplied commands and parameters are used by computer 36 to provide control signals and information to DAS 32, x-ray controller 28 and gantry motor controller 30. In addition, computer 36 operates a table motor controller 44 that controls a motorized table 46 to position patient 22 in gantry 12. Particularly, table 46 moves portions of patient 22 along a z-axis through gantry opening 48.

Figure 3:
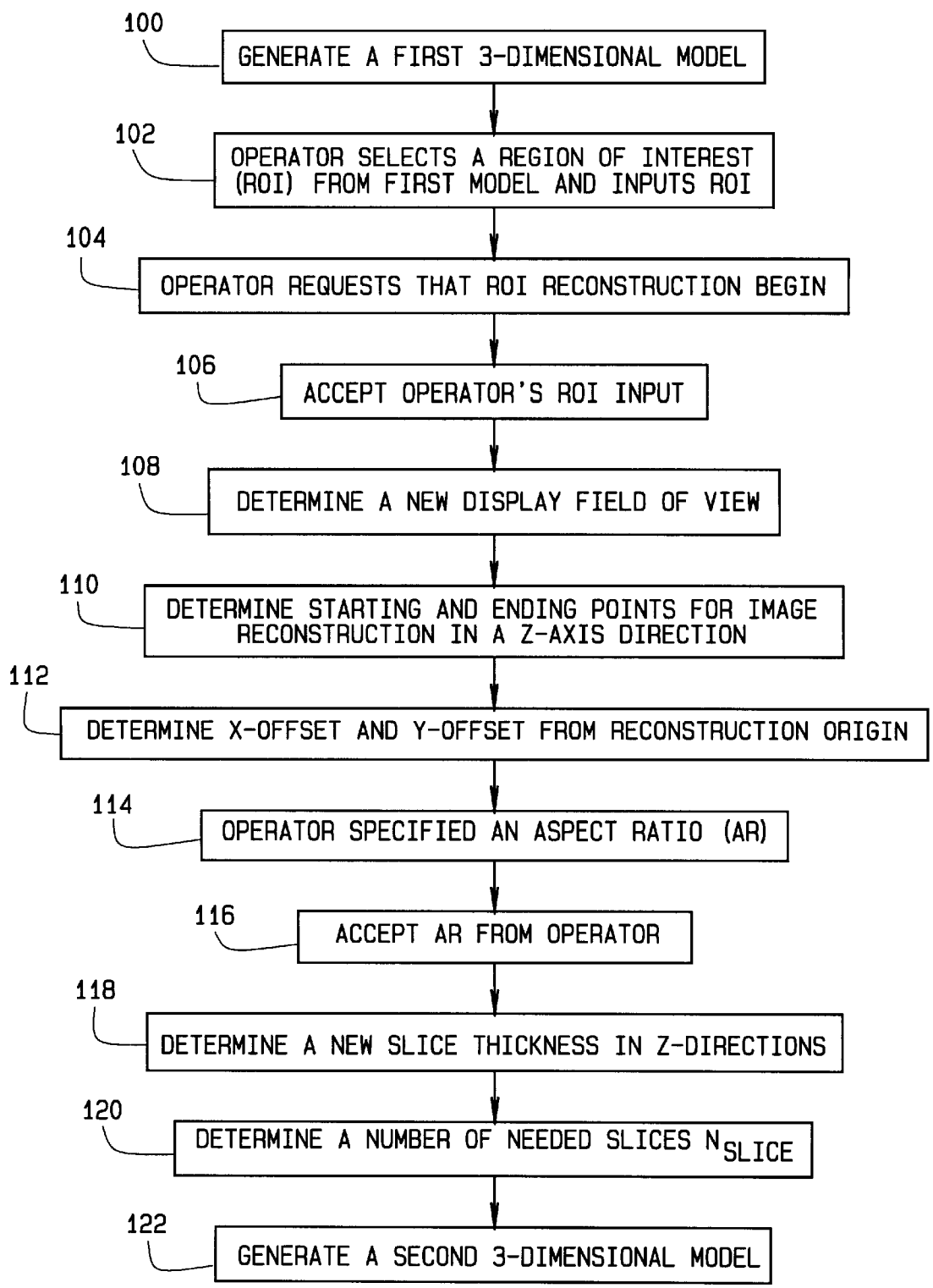
FIG. 3 is a flow diagram of an embodiment of a method for selecting retrospective reconstruction parameters.

Referring to FIG. 3, a method for retrospectively reconstructing an image in one embodiment includes generating 100 a first three-dimensional model (not shown) from a set of imaging data. The first model is displayed on, for example, cathode ray tube display 42 and typically is reconstructed using original scan parameters. Generated as part of the first three-dimensional model are data spacing parameters $SP_{xy}$ and $SP_z$, further described below and determined by original image size, slice thickness, and slice spacing. Parameters $SP_{xy}$ and $SP_z$ are stored in system 10 as part of the first three-dimensional model.

An imaging system 10 operator then selects a region of interest (ROI) (not shown) within the first model. Specifically, the operator inputs 102 to imaging system 10, e.g. via console 40, beginning and ending points of each dimension of the ROI, expressed in the first model coordinate system. Thus the operator enters, for example, a beginning point $S_{xbegin}$, and an ending point $S_{xend}$ of the ROI in an x-direction of the first model, a beginning point $S_{ybegin}$ and an ending point $S_{yend}$ of the ROI in a y-direction of the first model, and a beginning point $S_{zbegin}$ and an ending point $S_{zend}$ of the ROI in a z-direction of the first model. The operator then requests 104 via console 40 that ROI reconstruction begin.

Computer 36 accepts 106 the operator-specified ROI parameters and uses them to determine 108 a new display field of view (DFOV) for the retrospective reconstruction. More specifically, a new DFOV is determined using a relationship written as:

$$DFOV=MAX(|S_{xbegin}-S_{xend}|,|S_{ybegin}-S_{yend}|)*SP_{xy}$$

where data spacing parameter $SP_{xy}$ represents the first model imaging data spacing in the x- and y-directions.

Computer 36 then determines 110 starting and ending points for image reconstruction in a z-axis direction. More specifically, a starting slice $Z_{begin}$ and an ending slice $Z_{end}$ for reconstruction are determined using relationships written as:

$$Z_{begin}=INT(S_{zbegin}*SP_z)$$

$$Z_{end}=INT(S_{zend}*SP_z)$$

where data spacing parameter $SP_z$ represents the first model imaging data spacing in the z-directions.

An x-offset $O_x$ and a y-offset $O_y$ then are determined 112 with respect to a reconstruction origin, e.g. center of rotation 24, for the retrospective reconstruction using relationships written as:

$$O_x=S_{xbegin}*SP_{xy}$$

$$O_y=S_{ybegin}*SP_{xy}$$

where $SP_{xy}$ represents the first model imaging data spacing in the x- and y-directions.

Reducing the DFOV for a retrospective reconstruction increases the aspect ratio AR of data spacing in the x-y plane to data spacing along the z-axis. Increasing AR requires additional slices to be interpolated in the z-directions to reconstruct a three-dimensional model, which can result in imaging artifacts. Therefore in one embodiment the operator of system 10, using console 40, selects 114 an option to specify an AR of data spacing in the x-y plane (i.e. $SP_{xy}$) to data spacing along the z-axis (i.e. $SP_z$). More specifically, the operator specifies a constant AR, or chooses to limit the AR to a maximum value. Overlapping reconstructions then can be prescribed to generate a number of slices appropriate for minimizing artifacts.

Computer 36 accepts 116 the operator-specified AR and uses it to determine 118 a new slice thickness in the z-directions. More specifically, a new slice thickness $T_z$ is determined using a relationship written as:

$$T_z=(DFOV/SL_{res})/AR$$

where $SL_{res}$ is a resolution of a needed slice, AR is the operatorspecified aspect ratio, and DFOV is the new display field of view. Slice resolution $SL_{res}$ is a parameter stored in imaging system 10, or, in one embodiment, is another input specified by the operator via console 40.

Computer 36 then determines 120 a number of needed slices based on the desired AR. More specifically, a number of needed slices $N_{slice}$ is determined using a relationship written as:

$$N_{slice}((Z_{begin}-Z_{end})*SP_z)/T_z$$

where $T_z$ represents the new slice thickness.

Computer 36 then passes the above-described parameters to image reconstructor 34, which generates 122 a second model (not shown) from the imaging data based on the operator-specified region of interest. More specifically, image reconstructor 34 generates a new series of axial slices (not shown) which are used to form another three-dimensional volume concentrating on the ROI specified by the operator based on the first model.

The above-described method increases automation of reconstruction parameter entry and thus allows an imaging system operator to more easily prescribe retrospective reconstruction. Furthermore, the above-described method can be used for any three-dimensional model representation technique including, but not limited to, volume rendering, maximum intensity projection, and surface rendering.

It also should be understood that, although the above method is described herein with respect to a CT imaging system, the invention can be practiced in connection with other types of imaging systems. In some embodiments, the methods described herein are implemented by software, firmware or a combination thereof controlling either computer 36, image reconstructor 34, or both. Furthermore, the invention can be practiced using other processors besides computer 36 and image reconstructor 34.

While the invention has been described in terms of various specific embodiments, those skilled in the art will recognize that the invention can be practiced with modification within the spirit and scope of the claims.

What is claimed is:

1. A method for reconstructing an image from imaging data using an imaging system configured to accept input from an imaging system operator, said method comprising the steps of:

generating a three-dimensional first model from the imaging data;

accepting as input an operator-specified region of interest based on the first model; and generating a second model from the imaging data based on the operator-specified region of interest.

2. A method in accordance with claim 1 wherein the operator-specified region of interest includes at least two dimensions, and said step of accepting as input an operator-specified region of interest based on the first model comprises the step of accepting operator-specified beginning and ending points of each dimension of the region of interest.

3. A method in accordance with claim 2 wherein the first model is referenced using a coordinate system and the step of accepting- operator-specified beginning and ending points of each dimension of the region of interest comprises accepting the beginning and ending points expressed in the first model coordinate system.

4. A method in accordance with claim 3 wherein the first model includes x-, y-, and z-dimensions, and the step of accepting operator-specified beginning and ending points of each dimension of the region of interest comprises accepting a beginning point $S_{xbegin}$ and an ending point $S_{xend}$ in an x-direction of the first model, a beginning point $S_{ybegin}$ and an ending point $S_{yend}$ in a y-direction of the first model, and a beginning point $S_{zbegin}$ and an ending point $S_{zend}$ in a z-direction of the first model.

5. A method in accordance with claim 4 wherein the imaging system is configured to reconstruct an image from imaging data collected in slices, and said step of generating a second model from the imaging data based on the specified region of interest comprises the step of generating new slices for reconstruction.

6. A method in accordance with claim 5 wherein the new slices are axial slices.

7. A method in accordance with claim 5 wherein the imaging system is configured to reconstruct images using a display field of view and with respect to a reconstruction origin, and said step of generating new slices for reconstruction comprises the steps of:

determining a new display field of view;

determining starting and ending points for reconstruction in a z-axis direction; and determining an x-offset and a y-offset with respect to the reconstruction origin.

8. A method in accordance with claim 7 wherein said step of determining a new display field of view comprises the step of determining a new display field of view using a relationship written as:

$$DFOV=MAX\ (|S_{xbegin}-S_{xend}|, |S_{ybegin}-S_{yend}|)*SP_{xy}$$

where $SP_{xy}$ represents imaging data spacing in the x- and y-directions.

9. A method in accordance with claim 7 wherein said step of determining starting and ending points for reconstruction in a z-axis direction comprises the step of determining a starting slice $Z_{begin}$ and an ending slice $Z_{end}$ using relationships written as:

$$Z_{begin}=INT\ (S_{zbegin}*SP_z)$$

$$Z_{end}=INT\ (S_{zend}*SP_z)$$

where $SP_z$ represents imaging data spacing in the z-directions.

10. A method in accordance with claim 7 wherein said step of determining an x-offset and a y-offset with respect to the reconstruction origin comprises the step of determining an x-offset $O_x$ and a y-offset $O_y$ using relationships written as:

$$O_x=S_{xbegin}*SP_{xy}$$

$$O_y=S_{ybegin}*SP_{xy}$$

where $SP_{xy}$ represents imaging data spacing in the x- and y-directions.

11. A method in accordance with claim 7 further comprising the steps of:

accepting as input an operator-specified aspect ratio of imaging data spacing in the x- and y-directions to imaging data spacing in the z-directions; and generating the second model using the operator-specified aspect ratio.

12. A method in accordance with claim 11 wherein said step of generating the second model using the operator-specified aspect ratio comprises the steps of:

using an aspect ratio limited to a maximum value or specified as a constant value; and using overlapping reconstructions to generate the new slices.

13. A method in accordance with claim 12 wherein said step of using overlapping reconstructions to generate the new slices comprises the step of determining a number of needed slices $N_{slice}$ using a relationship written as:

$$N_{slice}=((Z_{begin}-Z_{end})*SP_z)/T_z$$

where $T_z$ represents a new slice thickness.

14. A method in accordance with claim 13 wherein said step of determining a number of needed slices $N_{slice}$ comprises the step of determining the new slice thickness $T_z$ using a relationship written as:

$$T_z=(DFOV/SL_{res})/AR$$

where $SL_{res}$ is a resolution of a needed slice, AR is the operator-specified aspect ratio, and DFOV is the new display field of view.

15. An imaging apparatus comprising an input device, a processor and an image reconstructor, said apparatus configured to:

generate a three-dimensional first model from imaging data;

accept as input an operator-specified region of interest based on the first model; and generate a second model from the imaging data based on the operator-specified region of interest.

16. An apparatus in accordance with claim 15 wherein the operator-specified region of interest includes at least two dimensions, and said apparatus being configured to accept as input an operator-specified region of interest based on the first model comprises being configured to accept operator-specified beginning and ending points of each dimension of the region of interest.

17. An apparatus in accordance with claim 16 further configured to generate and reference the first model using a coordinate system and to accept operator-specified beginning and ending points of each dimension of the region of interest expressed in the first model coordinate system.

18. An apparatus in accordance with claim 17 wherein the coordinate system includes x-, y-, and z-dimensions, and said apparatus being configured to accept operator-specified beginning and ending points of each dimension of the region of interest comprises being configured to accept a beginning point $S_{xbegin}$ and an ending point $S_{xend}$ in an x-direction of the first model, a beginning point $S_{ybegin}$ and an ending point $S_{yend}$ in a y-direction of the first model, and a beginning point $S_{zbegin}$ and an ending point $S_{zend}$ in a z-direction of the first model.

19. An apparatus in accordance with claim 18 configured to reconstruct an image from imaging data collected in slices, and said apparatus being configured to generate a second model from the imaging data based on the specified region of interest comprises being configured to generate new slices for reconstruction.

20. An apparatus in accordance with claim 19 wherein the new slices are axial slices.

21. An apparatus in accordance with claim 19 configured to reconstruct images using a display field of view and with respect to a reconstruction origin, and said apparatus being configured to generate new slices for reconstruction comprises being configured to:

determine a new display field of view;

determine starting and ending points for reconstruction in a z-axis direction; and determine an x-offset and a y-offset with respect to the reconstruction origin.

22. An apparatus in accordance with claim 21 wherein said apparatus being configured to determine a new display field of view comprises being configured to determine a new display field of view using a relationship written as:

$$DFOV = MAX\ (|S_{xbegin} - S_{xend}|, |S_{ybegin} - S_{yend}|) * SP_{xy}$$

where $SP_{xy}$ represents imaging data spacing in the x- and y-directions.

23. An apparatus in accordance with claim 21 wherein said apparatus being configured to determine starting and ending points for reconstruction in a z-axis direction comprises being configured to determine a starting slice $Z_{begin}$, and an ending slice $Z_{end}$ using relationships written as:

$$Z_{begin} = INT\ (S_{zbegin} * SP_z)$$

$$Z_{end} = INT\ (S_{zend} * SP_z)$$

where $SP_z$ represents imaging data spacing in the z-directions.

24. An apparatus in accordance with claim 21 wherein said apparatus being configured to determine an x-offset and a y-offset with respect to the reconstruction origin comprises being configured to determine an x-offset $O_x$ and a y-offset $O_y$ using relationships written as:

$$O_x = S_{xbegin} * SP_{xy}$$

$$O_y = S_{ybegin} * SP_{xy}$$

where $SP_{xy}$ represents imaging data spacing in the x- and y-directions.

25. An apparatus in accordance with claim 21 further configured to:

accept as input an operator-specified aspect ratio of imaging data spacing in the x- and y-directions to imaging data spacing in the z-directions; and generate the second model using the operator-specified aspect ratio.

26. An apparatus in accordance with claim 25 wherein said apparatus being configured to generate the second model using the operator-specified aspect ratio comprises being configured to:

use an aspect ratio limited to a maximum value or specified as a constant value; and use overlapping reconstructions to generate the new slices.

27. An apparatus in accordance with claim 26 wherein said apparatus being configured to use overlapping reconstructions to generate the new slices comprises being configured to determine a number of needed slices $N_{slice}$ using a relationship written as:

$$N_{slice}((Z_{begin} - Z_{end}) * SP_z)/T_z$$

where $T_z$ represents a new slice thickness.

28. An apparatus in accordance with claim 27 wherein said apparatus being configured to determine a number of needed slices $N_{slice}$ comprises being configured to determine the new slice thickness $T_z$ using a relationship written as:

$$T_z = (DFOV/SL_{res})/AR$$

where $SL_{res}$ is a resolution of a needed slice, AR is the operator-specified aspect ratio, and DFOV is the new display field of view.

* * * * *